United States Patent Office 3,417,324
Patented Dec. 17, 1968

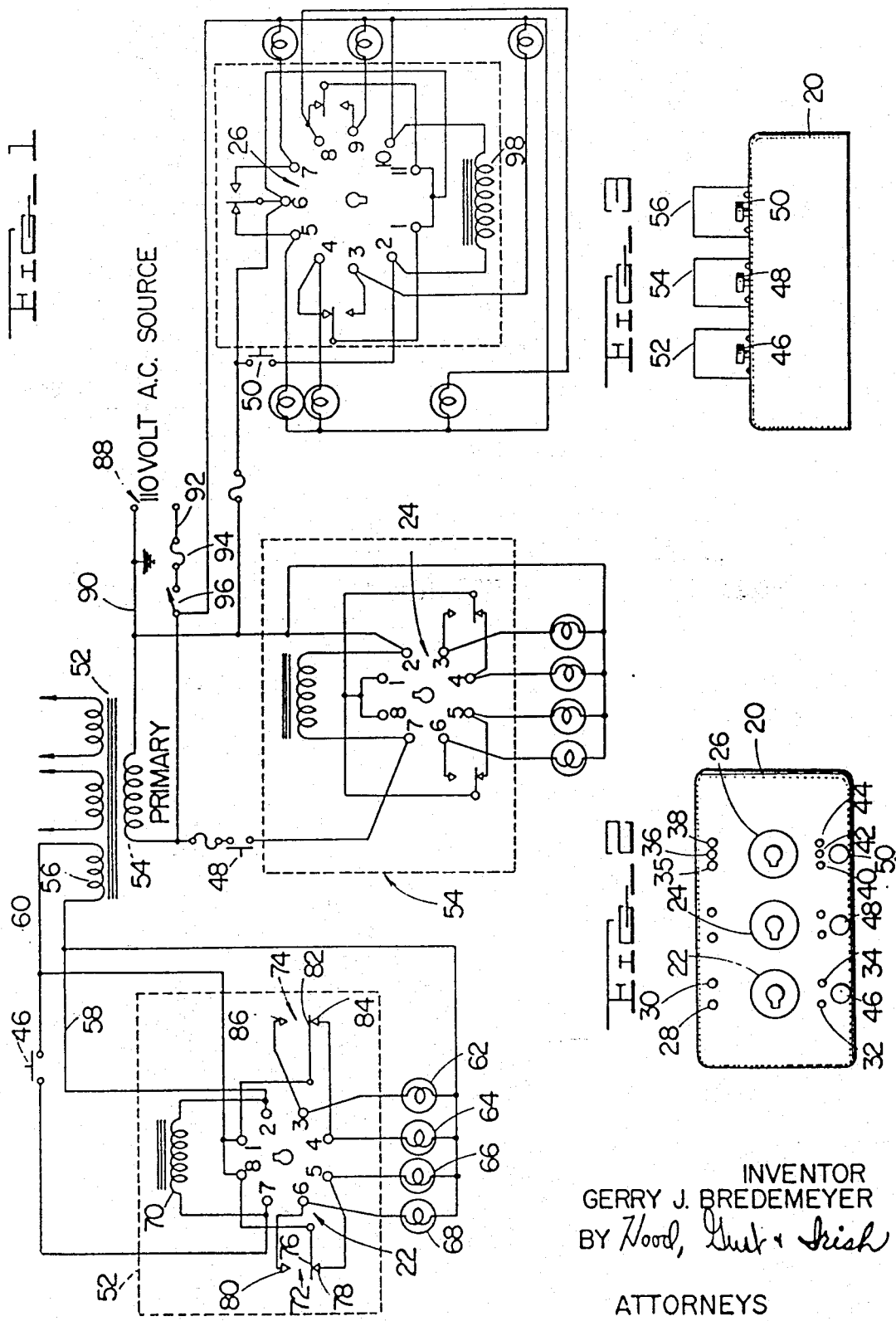

3,417,324
SWITCH CONTROLLED APPARATUS FOR TESTING THE COIL AND CONTACTS OF A RELAY
Gerry J. Bredemeyer, Fort Wayne, Ind., assignor of five percent to Leonard F. Mentzer, Fort Wayne, Ind.
Filed Apr. 6, 1966, Ser. No. 540,640
6 Claims. (Cl. 324—28)

ABSTRACT OF THE DISCLOSURE

A relay testing apparatus having a voltage source and plug-in type socket having terminal means for applying energizing voltage to the relay under test. In series with some of the terminal means are current indicating lamps. By manipulation of a testing switch associated with the voltage source selective indicators are illuminated in accordance with the condition of the relay coil and contacts.

---

The present invention relates to a relay testing apparatus and more particularly to an apparatus for testing the coil and contacts of an electromagnetic relay.

Electromagnetic relays conventionally have contacts and an actuating electromagnet housed in a hermetically sealed container. This container is normally provided with a base having protruding prongs arranged identically to those of conventional vacuum tubes. Equipment in which such relays are used is provided with sockets into which said relays may conveniently be plugged.

In the servicing of such equipment, it often occurs that a relay must be replaced because of a defect. In troubleshooting, since in some cases it is impossible to remove the housing so as to either view or test the internal components, the determination of whether or not a relay possesses some defect becomes time-consuming and difficult.

It is an object of this invention to provide an apparatus for testing such relays in a minimum of time and with a minimum of effort.

It is a further object of this invention to provide such a testing apparatus in which the simple manipulation of a control serves in determining the respect in which a relay may be defective.

In the accomplishment of this invention, there is provided an apparatus for testing a relay having an electromagnet operatively connected to at least one single-pole, double-throw switch in which the armature is normally closed with one of the two switch contacts. The apparatus includes a two-terminal source of energizing voltage and a plug-in type socket having terminal means for applying energizing voltage to the electromagnet. First circuit means connects the source to these terminal means whereby the electromagnet may be energized. A testing switch is connected to the circuit means for interrupting the application of energizing voltage to the electromagnet. Three terminals in the socket are utilized for applying energizing voltage to the contacts of the relay switch, the first of these terminals being adapted to be connected to the armature contact and the second and third of the terminals being adapted to be connected, respectively, to the two stationary contacts of the relay switch. A second circuit means connects the source to these three terminals. This second circuit means includes three circuit lines, one of these circuit lines connecting one terminal of the voltage source to the first terminal and the second and third circuit lines connecting the other terminal of the voltage source to the second and third terminals. In series with the second and third circuit lines are indicators, such as lamps, which provide an indication in response to the flow of current. By manipulation of the testing switch, if a relay inserted into the aforementioned socket is operating properly, the lamps as indicators will be caused to glow alternatively.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top plan view of one embodiment of this invention;

FIG. 2 is a side view thereof; and

FIG. 3 is a schematic diagram of the electrical circuitry embodied in this invention, this diagram being used in explaining the construction and operation of the arrangement.

Referring to FIGS. 1 and 2 of the drawings, a metal cabinet 20 has the electrical wiring of FIG. 3 contained therein. Three conventional tube sockets 22, 24 and 26 are mounted in the top plate of the cabinet 20, as shown more clearly in FIG. 1. For each of the sockets 22 and 24 there are provided four electric, indicating lamps 28, 30, 32 and 34 as shown. For the socket 26 there are provided six such lamps, these being indicated respectively by the numerals 35, 36, 38, 40, 42 and 44. For each of the sockets 22, 24 and 26, there are also provided three manually operated, normally open push-button switches indicated by the numerals 46, 48 and 50. The two sockets 22 and 24 are conventional 8-prong, octagonal tube sockets, whereas the tube socket 26 is a conventional 11-prong arrangement.

Each of the sockets 22, 24 and 26 is adapted to have plugged thereinto a relay, the three relays, respectively, being indicated by the numerals 52, 54 and 56.

Referring now to FIG. 3, the electrical circuitry contained within the cabinet 20 and connected to the various components described thus far will be described. A conventional step-down transformer 52 has a primary winding 54 and at least one secondary winding 56. One terminal of the secondary winding 56 is connected by a line 58 to terminal No. 2 of the socket 22. The other terminal of the secondary winding 56 is connected to socket terminal No. 7 by means of a circuit line 60 having in series therewith the switch 46. The socket terminals 1 and 8 are connected together and also to the line 60 at a location between the switch 46 and the secondary winding 56. The location of this last-mentioned connection is significant. The terminals Nos. 3, 4, 5 and 6 of the socket 22 are connected to lamps 62, 64, 66 and 68 as shown, the opposite sides of these lamps being connected together and to the line 58.

In the following description, it is assumed that the relay 52 contains one electromagnet 70 and two single-pole, double-throw switches generally indicated by the numerals 72 and 74, respectively. Each of these switches 72 and 74 has an armature an two stationary contacts, switch 72 having an armature contact 76 and two stationary contacts 78 and 80 respectively. The switch 74 has an armature contact 82 and two stationary contacts 84 and 86, respectively. The armatures 76 and 82 are, respectively, normally closed with the respective contacts 78 and 84 as shown. Upon energization of the electromagnet 70, the armatures 76 and 82 are operated in a direction to close against the stationary contacts 80 and 86, respectively, and to open from the contacts 78 and 84. Such relay 52 is conventional.

An alternating current power source indicated generally by the numeral 88 is connected by means of two lines 90 and 92 to the primary winding 54 of the transformer. In series with the line 92 is a fuse 94 and a normally open "On-Off" switch 96.

The operation of the invention thus far described will now be explained. Defects in relays such as the relay 52 appear in the following forms. If the coil 70 is defective, power applied thereto will ordinarily be ineffective in operating the armatures 76 and 82. On occasion, contacts of the switches 72 and 74 can become welded together. On the other hand, such contacts can become badly corroded or so defective that engagement thereof will not complete an electric circuit. The present invention is unique, because it can, by means of one simple operation, check for all of these possible defects. Only a matter of a few seconds are required in order to make a determination.

Assuming that a relay 52 plugged into the socket 22 is in good repair and power is applied to the primary winding 54, voltage appearing across the secondary winding 56 will be applied respectively to the terminal No. 2 of the socket 22 and the bottoms of the lamps 62, 64, 66 and 68 as shown. Current will thereupon flow through the lamp 66, energizing the same, to the terminal No. 5, through contacts 78 and 76, to terminal No. 8 of the socket and back to line 60. Lighting of the lamp 66 thereupon indicates that the two contacts 76 and 78 are making a proper connection. By the same token, the lamp 64 when it lights indicates that the two contacts 82 and 84 are properly engaged.

By depressing the push-button switch 46, a circuit is completed to the terminals Nos. 2 and 7 of the socket and in turn to the electromagnet 70. The armatures 76 and 82 are thereupon shifted into engagement with the contacts 80 and 86, respectively. At this moment, the previously ignited lamps 64 and 66 will be extinguished and the previously unlighted lamps 62 and 68 will light. This indicates that proper contact is being made in the two switches 72 and 74. Additionally, the depression of the push-button switch 46 also indicates that the coil 70 is in good repair. If this coil 70 should be open, depression of the switch 46 could not effectuate shifting of the armatures 76 and 82 into contact with the respective contacts 80 and 86. Immediately, an indication would be provided that the coil 70 was defective.

If the contacts 76, 78 and 80 should happen to be welded together, application of power to the secondary winding 56 would result in the lighting of both lamps 66 and 68. If the same condition prevailed in the switch 74, the two lamps 62 and 64 would be lighted.

If in the initial application of power, and with the switch 46 open, the lamp 66 did not light, this would indicate that no contact was being made between the two contacts 76 and 78. By the same token, operation of the switch 46 so as to move the armature 76 into contact with the contact 80, if the lamp 68 were not to light, would indicate that these contacts were defective.

Thus it will be seen that by the simple manipulation of only a single switch 46, a defect in an otherwise complicated relay can be immediately discerned without the necessity of removing any of the hermetic seals or by performing any other testing operations. In the embodiment of this invention illustrated and thus far described, it has been assumed that the coil 70 of the relay 52 is of the low voltage variety, meaning that it has a voltage rating less than that of the power source 88. In some instances, such relay coils are operated at the line voltage of the source 88 and this example is indicated as being present in the relay 54. As will be noted in FIG. 3, instead of the power source being connected to the secondary of the transformer 52, it is connected to the primary winding 54. In all other respects, the circuitry for the socket 24 and the relay 54 is the same as that for the socket 22 and the relay 52.

The socket 26 is illustrated for the purpose of demonstrating that this invention is applicable to relays having three or more relay switches which can be tested with the same facility and speed as the relays having a lesser number of switches. In this instance, the socket 26 is shown as having eleven terminals connected to the various single-pole, double-throw switches as shown and to the electromagnet 98 also as shown. This circuitry and the connections are the same as those described previously with the exception that an additional relay switch and lamp circuit is connected into the total circuit as shown. Operation of this circuitry is the same as that previously described.

For all three of the relay configurations, it will be noted that operation of the individual push-button switches results in the almost instantaneous determination of whether or not the respective relay is defective and wherein the defect lies.

While there have been described above the principles of this invention in connection with specific apparatus, it is to be clearly understood that this description is made only by way of example and not as a limitation to the scope of the invention.

What is claimed is:

1. Relay-testing apparatus including an electromagnet operatively connected to at least one single pole double throw switch in which the armature is normally closed with one of the two switch contacts, a two terminal source of energizing voltage, first terminal means for applying energizing voltage to the electromagnet, first circuit means connecting said source to said terminal means whereby said electromagnet may be energized, a testing switch connected to said circiut means for interrupting the application of energizing voltage to said electromagnet, second terminal means having three terminals for applying energizing voltage to the contacts of said relay swtich, the first of said terminals being adapted to be connected to the armature contact of said relay switch, the second and third of said terminals being adapted to be connected, resepctively, to the two stationary contacts of said relay switch, second circiut means connecting said source to said three terminals, and second circuit means including three circuit lines, one of said circuit lines connecting one terminal of said source to said first terminal, the second and third circuit lines connecting the other terminal of said source to said second and third terminals, respectively, first indicator means connected to said second circuit line for indicating the flow of current therethrough, and second indicator means connected to said third circuit line for indicating the flow of current therethrough.

2. The apparatus of claim 1 wherein said testing switch is a normally open manually operable switch connected in series with said first circuit means, said second circuit means being connected to said source at a location between said testing switch and said source whereby contacts of one of the two positions of the relay switch may be tested independently of the energization of said electromagnet.

3. The apparatus of claim 2 wherein said first and second indicator means are electric lamps connected in series with the respective circuit line.

4. The apparatus of claim 3 including third terminal means having three terminals for applying energizing voltage to the contacts of a second relay switch, the first of the last-mentioned terminals being adapted to be connected to the armature contact of the second relay switch, the second and third of said last-mentioned terminals being adapted to be connected, respectively, to the two stationary contacts of said second relay switch, third circuit means connecting said source to said last-mentioned terminals, said third circuit mean including three circuit lines, one of the last-mentioned circuit lines connecting one terminal of said source to the first of said last-mentioned terminals, the second and third of said last-mentioned circuit lines connecting the other terminal of said source to the second and third, respectively, of the last-mentioned terminals, and indicator means in each of the second and third circuit lines for indicating the flow of current therethrough.

5. The apparatus of claim 4 wherein said source includes the secondary winding of a step-down transformer.

6. The apparatus of claim 4 wherein said first, second and third terminal means is an octagonal socket into which a relay to be tested may be plugged.

References Cited
UNITED STATES PATENTS 2,877,405   3/1959   Morton -------------- 324—28

ARCHIE R. BORCHELT, *Primary Examiner.*

E. L. STOLARUN, *Assistant Examiner.*